United States Patent
Kakutani

(10) Patent No.: US 10,812,676 B2
(45) Date of Patent: Oct. 20, 2020

(54) IMAGE PROCESSING APPARATUS AND INFORMATION PROCESSING METHOD

(71) Applicant: CANON KABUSHIKI KAISHA, Tokyo (JP)

(72) Inventor: Naoya Kakutani, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/851,512

(22) Filed: Dec. 21, 2017

(65) Prior Publication Data

US 2018/0183973 A1 Jun. 28, 2018

(30) Foreign Application Priority Data

Dec. 28, 2016 (JP) ................................ 2016-255528

(51) Int. Cl.
*H04N 1/32* (2006.01)
*H04N 1/00* (2006.01)
*G06F 3/12* (2006.01)

(52) U.S. Cl.
CPC ....... *H04N 1/32673* (2013.01); *G06F 3/1203* (2013.01); *G06F 3/1234* (2013.01); *G06F 3/1286* (2013.01); *H04N 1/00244* (2013.01); *H04N 1/00344* (2013.01); *H04N 1/32662* (2013.01); *H04N 2201/0094* (2013.01)

(58) Field of Classification Search
CPC .................................................. H04N 1/32673
USPC ....................................................... 358/1.13
See application file for complete search history.

(56) References Cited

U.S. PATENT DOCUMENTS

| | | | | |
|---|---|---|---|---|
| 7,120,910 B2* | 10/2006 | Matsuda | ............ | H04N 1/00225 718/102 |
| 7,593,125 B2* | 9/2009 | Wang | ................. | H04N 1/00236 358/1.15 |
| 2004/0010325 A1* | 1/2004 | Naitoh | ................. | G06Q 10/087 700/65 |
| 2005/0213149 A1* | 9/2005 | Kuwahara | .............. | G06K 15/00 358/1.15 |
| 2011/0270771 A1* | 11/2011 | Coursimault | .......... | G06Q 10/06 705/304 |
| 2014/0002838 A1* | 1/2014 | Imine | ................. | H04N 1/00228 358/1.13 |
| 2016/0182704 A1* | 6/2016 | Minezawa | .......... | H04L 12/2818 455/420 |
| 2016/0261759 A1* | 9/2016 | Yanase | ............... | H04N 1/00204 |

(Continued)

FOREIGN PATENT DOCUMENTS

CN 1783067 A 6/2006
CN 102196135 A 9/2011
(Continued)

*Primary Examiner* — Jacky X Zheng
(74) *Attorney, Agent, or Firm* — Canon U.S.A., Inc. IP Division

(57) ABSTRACT

The present disclosure relates to an image processing apparatus and an information processing method, and more particular an image processing apparatus including an acceptance unit configured to accept an operation performed on the image processing apparatus, and a controller configured to perform control such that an operation performed on the image processing apparatus is not accepted by the acceptance unit while a service associated with remote assistance is accepted based on an access from an external apparatus.

13 Claims, 11 Drawing Sheets

(56) References Cited

U.S. PATENT DOCUMENTS

2017/0163829 A1* 6/2017 Fujioka .............. H04N 1/00891
2017/0195523 A1* 7/2017 Lim .................... H04N 1/4433

FOREIGN PATENT DOCUMENTS

| CN | 104735279 A | 6/2015 |
|----|---|---|
| JP | H10-294844 A | 11/1998 |
| JP | 2006-146566 A | 6/2006 |
| JP | 2007-083682 A | 4/2007 |
| JP | 2009-225316 A | 10/2009 |
| JP | 2011-024014 A | 2/2011 |
| JP | 2011-088448 A | 5/2011 |
| JP | 2012203813 A | 10/2012 |
| JP | 201411619 A | 1/2014 |
| JP | 2016-181774 A | 10/2016 |

\* cited by examiner

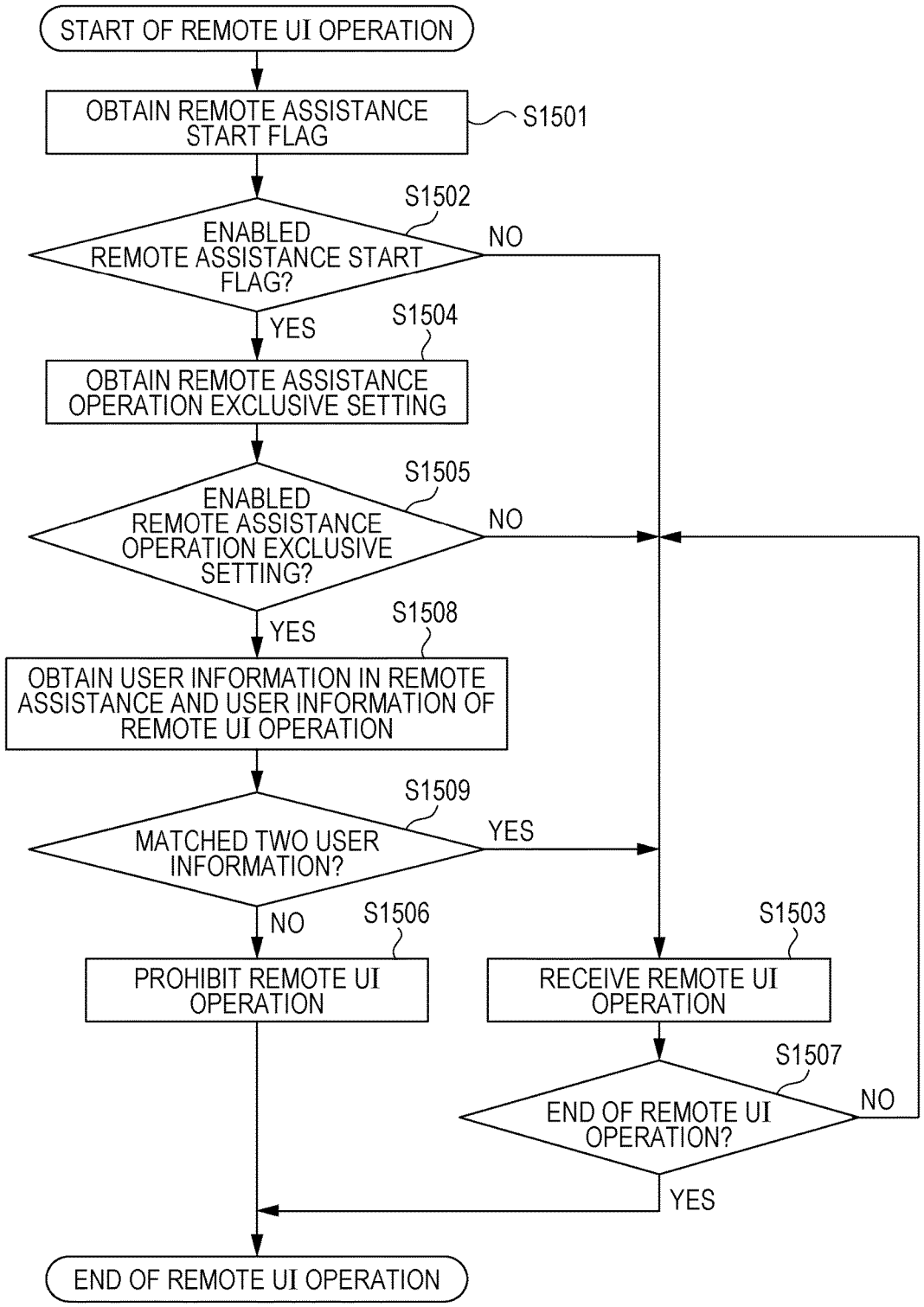

IMAGE PROCESSING APPARATUS AND INFORMATION PROCESSING METHOD

BACKGROUND

Field of the Disclosure

The present disclosure relates to an image processing apparatus and an information processing method.

Description of the Related Art

As usage and procedures of trouble shooting of multifunction peripherals become complicated, customers frequently make inquiries to call centers of makers in a direct manner and obtain responses. To appropriately and swiftly perform procedures of the trouble shooting, a support system including a multifunction peripheral and a failure management server of a call center which manages error information of the multifunction peripheral has been developed.

In such a support system, assistance of a multifunction peripheral by remote control performed by an operator using an information processing apparatus in a call center has been proposed. In the support system, software of customers which is a target of the remote assistance may be operated or checked by the information processing apparatus in the call center. According to Japanese Patent Laid-Open No. 2012-203813, for example, a PC screen of a customer is captured and transmitted so that an operator may quickly recognize a trouble state.

However, while an operator or the like performs remote assistance on a multifunction peripheral through a network, another user may interrupt the remote assistance.

Japanese Patent Laid-Open No. 2014-11619 discloses an image processing apparatus which may perform exclusive control for excluding a conflicting operation setting request while a reception order is ensured even in a case where a plurality of operation setting requests are received from an external apparatus, such as an operation unit of an apparatus body or a mobile terminal. However, even in the image processing apparatus according to Japanese Patent Laid-Open No. 2014-11619, if an operation instruction is issued by another user after start of the remote assistance, setting information of the multifunction peripheral may be updated and the remote assistance may be interrupted.

SUMMARY

According to an embodiment of the present disclosure, an image processing apparatus includes an acceptance unit configured to accept an operation performed on the image processing apparatus, and a controller configured to perform control such that an operation performed on the image processing apparatus is not accepted by the acceptance unit while a service associated with remote assistance is accepted based on an access from an external apparatus.

Further features of the present disclosure will become apparent from the following description of exemplary embodiments with reference to the attached drawings.

BRIEF DESCRIPTION OF THE DRAWINGS

FIG. 11 is a flowchart of a process performed by the multifunction peripheral according to one or more aspects of the present disclosure.

DESCRIPTION OF THE EMBODIMENTS

Hereinafter, embodiments of the present disclosure will be described with reference to the accompanying drawings.

First Embodiment

Figure 1:
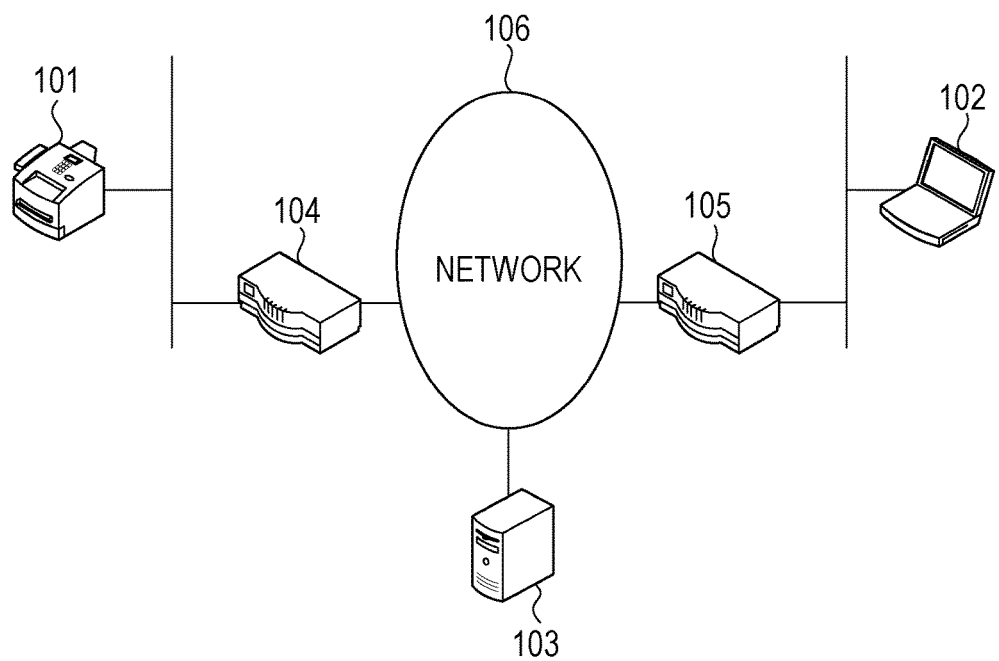
FIG. 1 is a diagram illustrating a system configuration of an assistance system according to one or more aspects of the present disclosure.

FIG. 1 is a diagram illustrating a system configuration of an assistance system according to one or more aspects of the present disclosure. The assistance system includes a multifunction peripheral 101, an operator PC 102, a relay server 103, a firewall (FW) 104, and an FW 105. These components are connected to one another through a network 106. The multifunction peripheral 101 is an example of an image processing apparatus. Other examples of the image processing apparatus include a printer and a scanner. The operator PC 102 is an information processing apparatus, such as a personal computer (PC), a server apparatus, or a tablet apparatus, installed in a call center which accepts questions about the multifunction peripheral 101. The relay server 103 relays communication between the multifunction peripheral 101 and the operator PC 102 and is constituted by an information processing apparatus, such as a PC, a server apparatus, or a tablet apparatus.

The multifunction peripheral 101 and the operator PC 102 communicate with each other through the relay server 103.

Each of the multifunction peripheral 101 and the operator PC 102 has a data communication function of performing data communication by executing call control in accordance with hyper test transfer protocol (HTTP).

In the example of FIG. 1, the multifunction peripheral 101 is connected to the network 106 through the FW 104. Similarly, the operator PC 102 is connected to the network 106 through the FW 105. The relay server 103 is also connected to the network 106.

In data communication by the HTTP, client nodes perform data communication by performing POST/GET on a uniform resource identifier (URI) supplied from an HTTP relay server. By this, the client nodes may perform the data communication even if the client nodes are shielded by a private address area or an FW. In this embodiment, each of the multifunction peripheral 101 and the operator PC 102 operate as an HTTP client node. It is assumed that the FWs 104 and 105 are disposed between the multifunction peripheral 101 and the network 106 and between the operator PC 102 and the network 106, respectively, in this embodiment. However, the multifunction peripheral 101 and the operator PC 102 may be directly connected to the network 106 without a FW. Furthermore, the assistance system may include other FWs than the FWs 104 and 105. Moreover, the assistance system may include a plurality of multifunction peripherals or a plurality of operator PCs.

Figure 2:
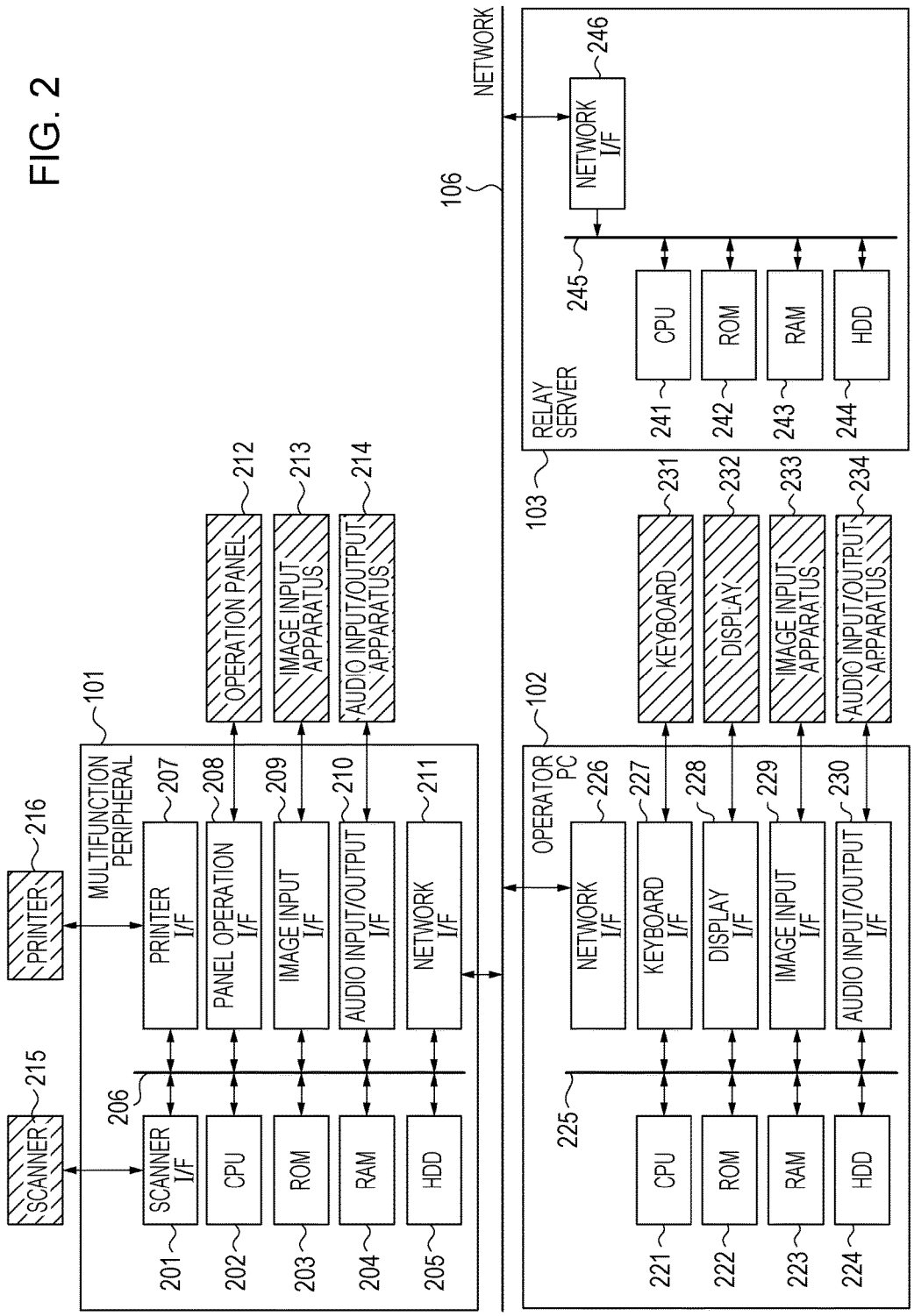
FIG. 2 is a diagram illustrating hardware configurations of components included in the assistance system according to one or more aspects of the present disclosure.

FIG. 2 is a diagram illustrating hardware configurations of the components included in the assistance system according to one or more aspects of the present disclosure.

The multifunction peripheral 101 includes a scanner interface (I/F) 201, a central processing unit (CPU) 202, a read only memory (ROM) 203, a random access memory (RAM) 204, a hard disk (HDD) 205, and a printer I/F 207. The multifunction peripheral 101 further includes a panel operation I/F 208, an image input I/F 209, an audio input/output I/F 210, and a network I/F 211. The components are connected to one another through a system bus 206.

The scanner I/F 201 controls image input from a scanner 215.

The CPU 202 integrally controls access to the various devices connected to the system bus 206 based on control programs stored in the ROM 203 or the HDD 205.

The ROM 203 is a storage device which stores the control programs which are executable by the CPU 202.

The RAM 204 functioning as a main memory, a work area, or the like of the CPU 202 is a storage device in which memory capacity thereof may be expanded by an option RAM connected to an expansion port.

The HDD 205 is a storage device which stores a boot program, various applications, font data, user files, an edit file, and the like. Although the multifunction peripheral 101 uses the HDD 205 as a storage which stores various data in this embodiment, an external storage device, such as an SD card or a flash memory, may be used.

The printer I/F 207 controls image output to a printer 216.

The panel operation I/F 208 performs control of display in an operation panel 212, such as a touch panel, and control of input of various setting information based on operations performed through the operation panel 212.

The image input I/F 209 controls image input from an image input apparatus 213, such as a camera.

The audio input/output I/F 210 controls audio input/output between the audio input/output I/F 210 and an audio input/output apparatus 214, such as a head set.

The network I/F 211 performs data communication through an external network using a network cable.

The CPU 202 executes processes based on programs stored in the ROM 203 or the HDD 205 so as to execute functions of the multifunction peripheral 101 described below with reference to FIG. 3 and processes of flowcharts in FIGS. 4, 7, 10, and 11.

The operator PC 102 includes a CPU 221, a ROM 222, a RAM 223, the HDD 224, a network I/F 226, a keyboard I/F 227, a display I/F 228, an image input I/F 229, and an audio input/output I/F 230. The components are connected to one another through a system bus 225.

The CPU 221 integrally controls access to the various devices connected to the system bus 225 based on control programs stored in the ROM 222 or the HDD 224.

The ROM 222 is a storage device which stores the control programs which are executable by the CPU 221.

The RAM 223 functioning as a main memory, a work area, or the like of the CPU 221 is a storage device in which memory capacity thereof may be expanded by an option RAM connected to an expansion port.

The HDD 224 is a storage device which stores a boot program, various applications, font data, user files, an edit file, and the like. Although the operator PC 102 uses the HDD 224 as a storage which stores various data in this embodiment, an external storage device, such as an SD card or a flash memory, may be used.

The network I/F 226 performs data communication through an external network using a network cable.

The keyboard I/F 227 controls input from a keyboard 231 or a pointing device, such as a mouse.

The display I/F 228 controls display in a display 232.

The image input I/F 229 controls image input from an image input apparatus 233, such as a camera.

The audio input/output I/F 230 controls audio input/output between the audio input/output I/F 230 and an audio input/output apparatus 234, such as a head set.

Figure 5:
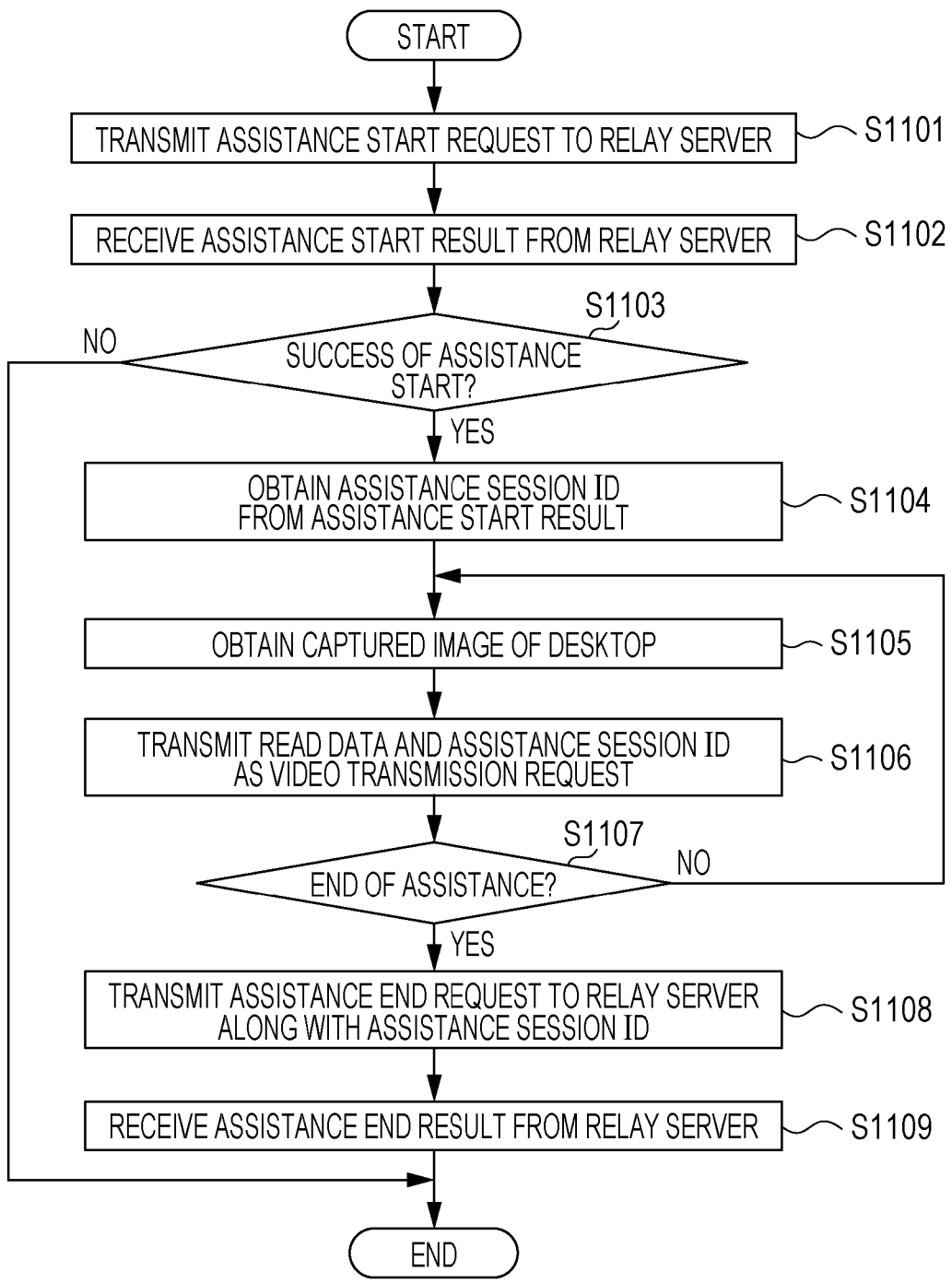
FIG. 5 is a flowchart of a process performed by an operator PC according to one or more aspects of the present disclosure.

The CPU 221 executes processes based on programs stored in the ROM 222 or the HDD 224 so as to execute functions of the operator PC 102 and a process of a flowchart illustrated in FIG. 5.

The relay server 103 includes a CPU 241, a ROM 242, a RAM 243, an HDD 244, and a network I/F 246. The components are connected to one another through a system bus 245.

The CPU 241 integrally controls access to the various devices connected to the system bus 245 based on control programs stored in the ROM 242 or the HDD 244.

The ROM 242 is a storage device which stores the control programs which are executable by the CPU 241.

The RAM 243 functioning as a main memory, a work area, or the like of the CPU 241 is a storage device in which memory capacity thereof may be expanded by an option RAM connected to an expansion port.

The HDD 244 is a storage device which stores a boot program, various applications, font data, user files, an edit file, and the like. Although the relay server 103 uses the HDD 244 as a storage which stores various data in this embodiment, an external storage device, such as an SD card or a flash memory, may be used.

The network I/F 246 performs data communication with an external network using a network cable.

The CPU 241 executes processes based on programs stored in the ROM 242 or the HDD 244 so as to execute functions of the relay server 103 and a process of a flowchart described below with reference to FIG. 6.

Figure 3:
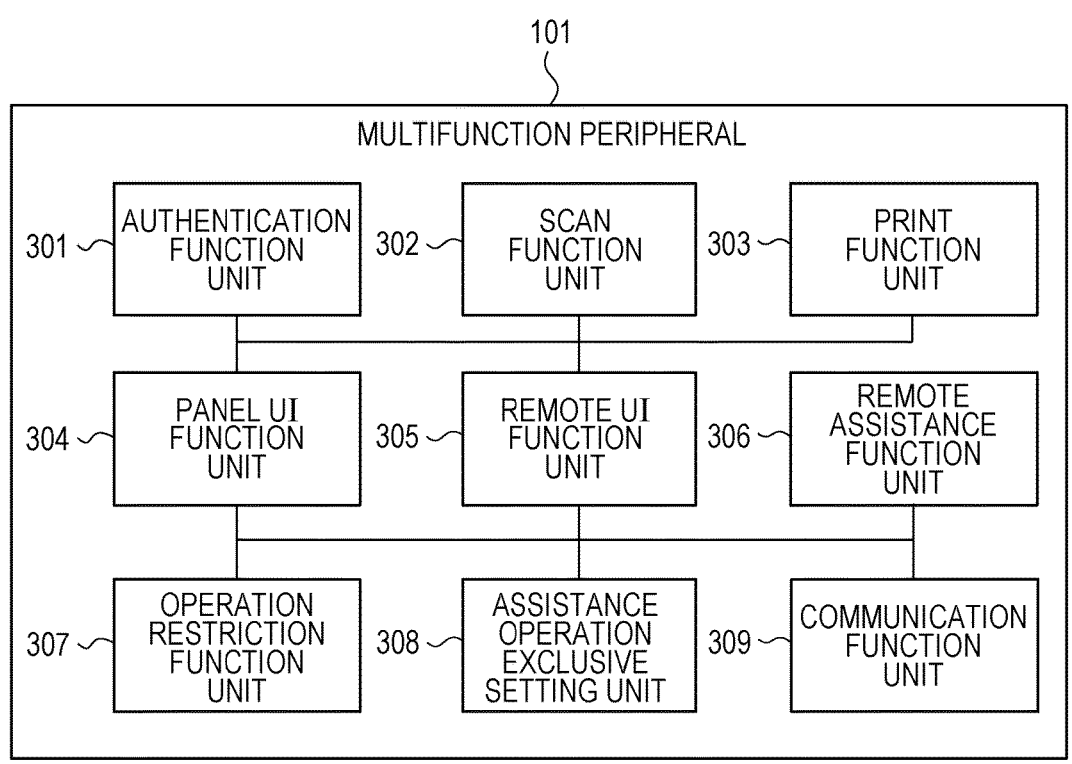
FIG. 3 is a diagram illustrating a functional configuration of a multifunction peripheral according to one or more aspects of the present disclosure.

FIG. 3 is a diagram illustrating a functional configuration of the multifunction peripheral 101 according to one or more aspects of the present disclosure. The multifunction peripheral 101 includes an authentication function unit 301, a scan function unit 302, a print function unit 303, a panel UI function unit 304, a remote UI function unit 305, a remote assistance function unit 306, an operation restriction function unit 307, an assistance operation exclusive setting unit 308, and a communication function unit 309.

The authentication function unit 301 performs a process of authenticating a user who logs in the multifunction peripheral 101.

The scan function unit 302 controls the scanner 215 through the scanner I/F 201.

The print function unit 303 controls the printer 216 through the printer I/F 207.

The panel UI function unit 304 accepts input through the operation panel 212 using the panel operation I/F 208.

The remote UI function unit 305 supplies a remote UI screen to be used for operating the multifunction peripheral 101 to an external information processing apparatus and accepts an operation instruction through the supplied remote UI screen.

The remote assistance function unit 306 performs a process in accordance with an instruction issued by the operator PC 102 as an assistance process for the multifunction peripheral 101. External assistance for the multifunction peripheral 101 through a network is referred to as "remote assistance". Hereinafter, an operation associated with the remote assistance is referred to as a "remote assistance operation". Examples of the remote assistance operation include an operation of displaying an assistance image (for example, a still image or a moving image indicating a method for addressing a failure) in the operation panel 212 of the multifunction peripheral 101. By this, the user may recognize the method for addressing a current failure. The examples of the remote assistance operation further include an operation of updating setting information of the multifunction peripheral 101 to an appropriate value. By this, in a case where the user mistakenly changes setting information of the multifunction peripheral 101 or the like, the assistance system may set an appropriate value to the setting information of the multifunction peripheral 101.

The operation restriction function unit 307 performs control such that, when the remote assistance operation is performed using the operator PC 102, an instruction for operating the multifunction peripheral 101 issued by another information processing apparatus is not accepted.

The assistance operation exclusive setting unit 308 determines whether an operation instruction issued by another information processing apparatus is to be accepted at a time of remote assistance based on an operation performed through the operation panel 212.

The communication function unit 309 performs communication with an external apparatus, such as the operator PC 102, through the network I/F 211.

The remote assistance operation in the assistance system according to this embodiment will be briefly described. First, the multifunction peripheral 101 accesses the relay server 103 and a state in which reception of video image data for assistance from the operator PC 102 is waited is entered. Subsequently, the operator PC 102 accesses the relay server 103 and starts transmission of video image data for assistance. The operator PC 102 displays an image for assisting the user operating the multifunction peripheral 101 in the display 232 of the operator PC 102. Thereafter, the operator PC 102 obtains a captured image (a still image or a moving image) of the display 232 and transmits the obtained captured image to the multifunction peripheral 101 through the relay server 103. The multifunction peripheral 101 displays the captured image of the display 232 in the operation panel 212 so that assistance of the multifunction peripheral 101 for the user is realized.

Hereinafter, processes performed by the multifunction peripheral 101, the operator PC 102, and the relay server 103 will be described in detail.

Figure 4:
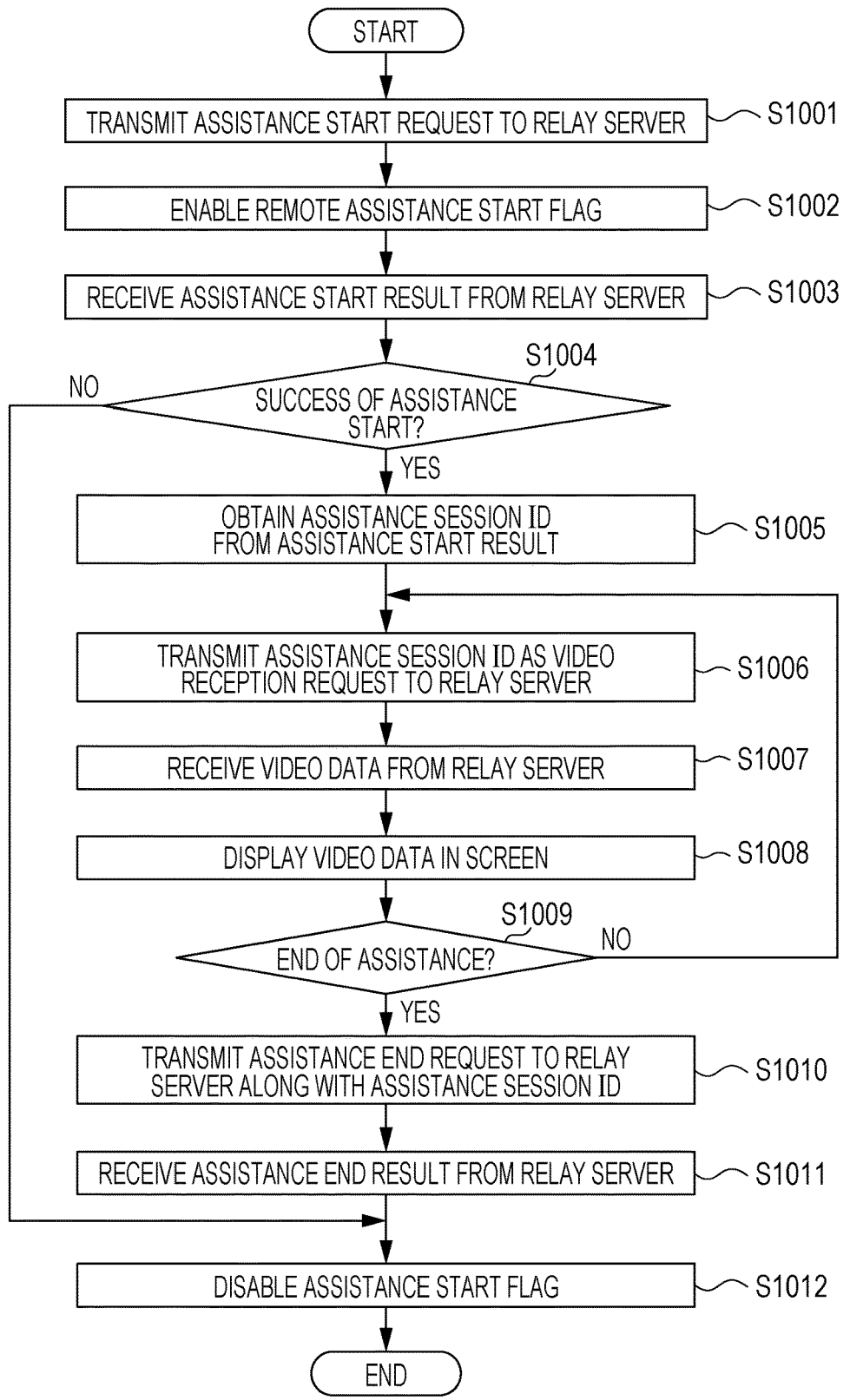
FIG. 4 is a flowchart of a process performed by the multifunction peripheral according to one or more aspects of the present disclosure.

FIG. 4 is a flowchart of a process performed by the multifunction peripheral 101 according to one or more aspects of the present disclosure. The process performed by the multifunction peripheral 101 at a time of a remote assistance operation will be described with reference to FIG. 4.

In step S1001, the CPU 202 transmits a request for starting a remote assistance operation to the relay server 103. The CPU 202 transmits a request for starting a remote assistance operation by transmitting information indicating a request for starting a remote assistance operation to the relay server 103, for example.

In step S1002, the CPU 202 enables a remote assistance start flag stored in the RAM 204. The remote assistance start flag is information indicating whether the remote assistance operation is being performed. The CPU 202 enables the remote assistance start flag by updating a value of the remote assistance start flag stored in the RAM 204 by a value indicating that the remote assistance operation is being performed.

In step S1003, the CPU 202 receives information indicating whether the remote assistance operation has been successfully started in response to the start request transmitted from the relay server 103 in step S1001.

In step S1004, the CPU 202 determines whether the information received in step S1003 indicates that the remote assistance operation has been successfully started. When determining that the information received in step S1003 indicates that the remote assistance operation has been successfully started, the CPU 202 proceeds to step S1005. On the other hand, when determining that the information received in step S1003 indicates that start of the remote assistance operation has failed, the CPU 202 proceeds to step S1012.

In step S1005, the CPU 202 obtains an assistance session ID from data received in step S1003 along with the success information. The assistance session ID is an identifier which is issued by the relay server 103 and which identifies assistance to be performed.

In step S1006, the CPU 202 transmits a video image reception request to the relay server 103. The CPU 202 transmit a video image reception request by transmitting information indicating a video image reception request to the relay server 103, for example. Furthermore, the CPU 202 transmits the assistance session ID obtained in step S1005 along with the video image reception request to the relay server 103.

In step S1007, the CPU 202 receives video image data from the relay server 103. The reception process in step S1007 is started after the operator PC 102 transmits the video image data. Therefore, the CPU 202 waits until the operator PC 102 transmits the video image data.

In step S1008, the CPU 202 displays the video image data received in step S1007 in the operation panel 212.

In step S1009, the CPU 202 determined whether the remote assistance operation is to be terminated. When receiving the information indicating that the remote assistance operation is to be terminated from the relay server 103, for example, the CPU 202 may determine that the remote assistance operation is to be terminated, and otherwise, the CPU 202 may determine that the remote assistance operation is not to be terminated. Alternatively, when receiving an instruction for terminating the remote assistance operation issued by the user through the operation panel 212, the CPU 202 may determine that the remote assistance operation is to be terminated, and otherwise, the CPU 202 may determine that the remote assistance operation is not to be terminated. When determining that the remote assistance operation is to be terminated, the CPU 202 proceeds to step S1010, and otherwise, the CPU 202 returns to step S1006.

In step S1010, the CPU 202 transmits a request for terminating the remote assistance operation to the relay server 103. The CPU 202 transmits the termination request by transmitting information indicating the request for terminating the remote assistance operation to the relay server 103, for example. Furthermore, the CPU 202 transmits the assistance session ID obtained in step S1005 to the relay server 103 along with the termination request. In step S1011, the CPU 202 receives information indicating that the remote assistance operation has been successfully terminated from the relay server 103.

In step S1012, the CPU 202 disables the remote assistance start flag which enabled in step S1002 and terminates the process in FIG. 4. The CPU 202 disables the remote assistance start flag by updating the value of the remote assistance start flag stored in the RAM 204 by a value indicating that the remote assistance operation is not being performed.

In this embodiment, a period of time from when the process in step S1001 is performed to when the process in step S1011 is performed is defined as a remote assistance operation period. Specifically, a period of time from when the multifunction peripheral 101 performs a process of transmitting the request for starting the remote assistance operation to the relay server 103 to when the multifunction peripheral 101 receives a result of termination of the remote assistance operation from the relay server 103 is defined as the remote assistance operation period. In this way, the CPU 202 may prohibit any operation through the remote UI screen in the period of time from when the process of transmitting the request for starting the remote assistance operation is performed to when the process of receiving a result of termination of the remote assistance operation from the relay server 103 is performed.

Alternatively, a period from step S1004 to step S1009 may be defined as the remote assistance operation period. Specifically, the CPU 202 may enable the remote assistance start flag after the process in step S1004 is completed and disable the remote assistance start flag after it is determined that the remote assistance operation is to be terminated in step S1009. In this way, the CPU 202 may prohibit operations performed through the remote UI screen after the information indicating that the remote assistance operation is successfully started is actually received until it is determined that the termination of the remote assistance operation is determined. Accordingly, the CPU 202 may minimize the period of time in which operations performed through the remote UI screen is prohibited by prohibiting operations performed through the remote UI screen only in a period of time from when it is actually determined that the remote assistance operation is to be performed to when the termination of the remote assistance operation is determined. By this, the assistance system may increase the period of time in which a user may perform an operation through the remote UI screen and improve usability of the operation of the multifunction peripheral 101 through the remote UI screen.

FIG. 5 is a flowchart of a process performed by the operator PC 102 according to one or more aspects of the present disclosure. The process performed by the operator PC 102 at the time of the remote assistance operation will be described with reference to FIG. 5.

In step S1101, the CPU 221 transmits a request for starting a remote assistance operation to the relay server 103. The CPU 221 transmits a start request by transmitting information indicating a request for starting the remote assistance operation to the relay server 103, for example.

In step S1102, the CPU 221 receives information indicating whether the remote assistance operation has been successfully started in response to the start request transmitted from the relay server 103 in step S1101.

In step S1103, the CPU 221 determines whether the information received in step S1102 indicates that the remote assistance operation has been successfully started. When determining that the information received in step S1102 indicates that the remote assistance operation has been successfully started, the CPU 221 proceeds to step S1104. On the other hand, when determining that the information received in step S1102 indicates that start of the remote assistance operation has failed, the CPU 221 terminates the process in FIG. 5.

In step S1104, the CPU 221 obtains an assistance session ID from data received in step S1102 along with the success information.

In step S1105, the CPU 221 obtains a captured image of the screen displayed in the display 232. The CPU 221 may periodically obtain a plurality of captured images of the screen displayed in the display 232 in a set interval so as to obtain the captured images of a moving image displayed in the display 232.

In step S1106, the CPU 221 transmits a request for transmitting the image obtained in step S1105 to the multifunction peripheral 101 to the relay server 103. The CPU 221 transmits the assistance session ID obtained in step S1104 and the image data obtained in step S1105 to the relay server 103 along with the request for transmitting the image obtained in step S1105 to the multifunction peripheral 101.

In step S1107, the CPU 221 determines whether the remote assistance operation is to be terminated. The CPU 221 determines that the remote assistance operation is to be terminated when receiving information indicating that the remote assistance operation is to be terminated from the multifunction peripheral 101, for example. On the other hand, when information indicating that the remote assistance operation is to be terminated has not been transmitted from the multifunction peripheral 101, for example, the CPU 221 determines that the remote assistance operation is not to be terminated.

Furthermore, when all assistance images are displayed in the display 232 and captured images of the display 232 corresponding to the all displayed images are transmitted to the relay server 103, for example, the CPU 221 may determine that the remote assistance operation is to be terminated. Furthermore, in a case where all the assistance images are displayed in the display 232 and at least one of the captured images of the display 232 has not been transmitted to the relay server 103, for example, the CPU 221 may determine that the remote assistance operation is not to be terminated.

When determining that the remote assistance operation is to be terminated, the CPU 221 proceeds to step S1108, and otherwise, the CPU 221 returns to step S1105.

In step S1108, the CPU 221 transmits a request for terminating the remote assistance operation to the relay server 103. The CPU 221 transmits the assistance session ID obtained in step S1104 to the relay server 103 along with the request for terminating the remote assistance operation.

In step S1109, the CPU 221 receives information indicating that the remote assistance operation has been successfully terminated from the relay server 103, and the process in FIG. 5 is terminated.

Figure 6:
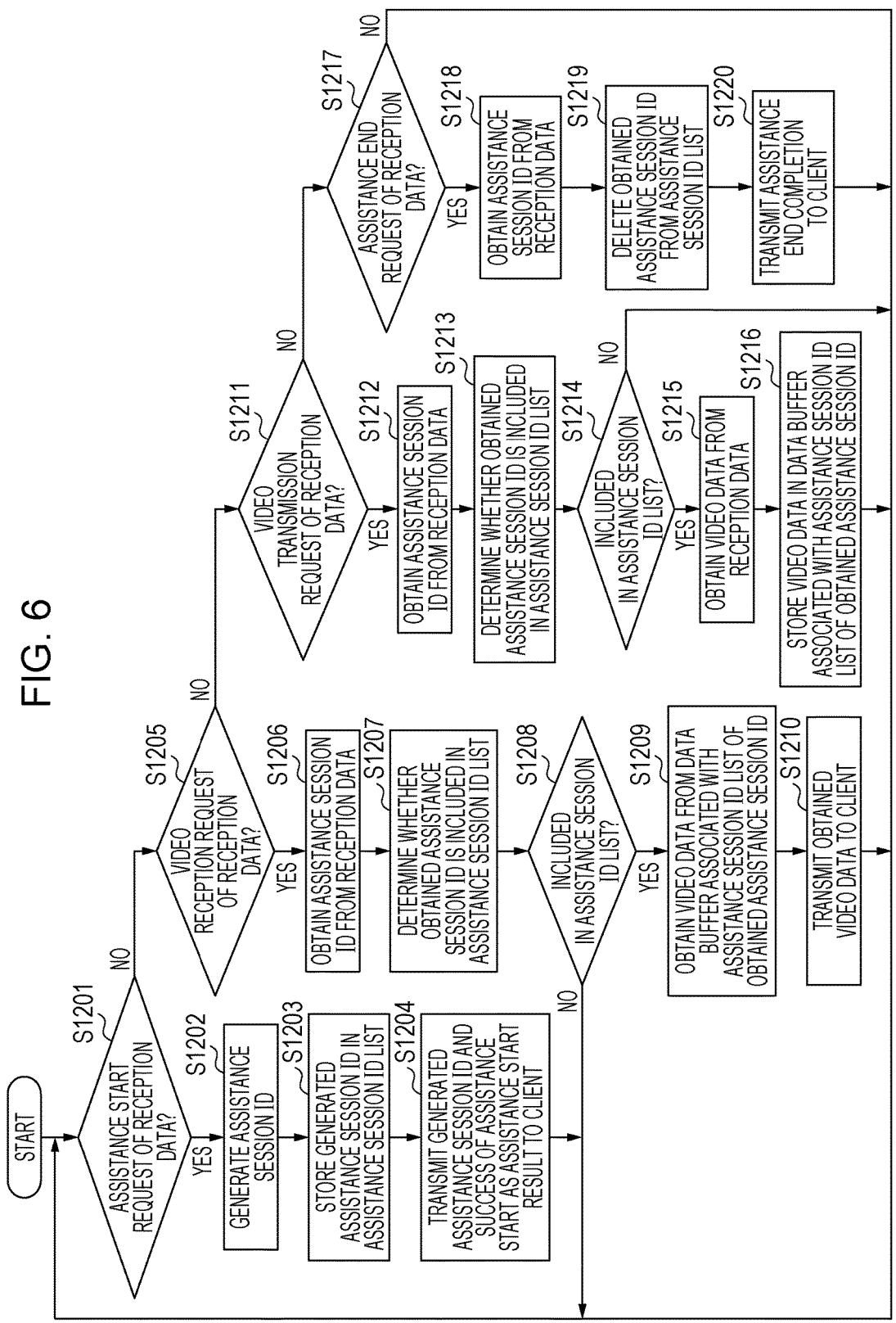
FIG. 6 is a flowchart of a process performed by a relay server according to one or more aspects of the present disclosure.

FIG. 6 is a flowchart of a process performed by the relay server 103 according to one or more aspects of the present disclosure. The process performed by the relay server 103 at the time of the remote assistance operation will be described with reference to FIG. 6.

In step S1201, the CPU 241 externally receives data and determines whether the received data indicates a request for starting the remote assistance operation. When the determination is affirmative, the CPU 241 proceeds to step S1202. On the other hand, when the determination is negative, the CPU 241 proceeds to step S1205.

In step S1202, the CPU 241 generates an assistance session ID for identifying the remote assistance operation corresponding to the request for starting the remote assistance operation received in step S1201.

In step S1203, the CPU 241 adds the assistance session ID generated in step S1202 to an assistance session ID list which is a list type data collectively including assistance session IDs. The assistance session ID list is stored in the HDD 244 or the like.

In step S1204, the CPU 241 transmits the assistance session ID generated in step S1202 to a client which is a transmission source of the request for starting the remote assistance operation received in step S1201 along with information indicating that the remote assistance operation has been successfully started. The client is the multifunction peripheral 101 or the operator PC 102. After completing the process in step S1204, the CPU 241 returns to step S1021.

In step S1205, the CPU 241 determines whether the data received in step S1201 indicates a request for receiving a video image. When the determination is affirmative, the CPU 241 proceeds to step S1206. On the other hand, when the determination is negative, the CPU 241 proceeds to step S1211.

In step S1206, the CPU 241 obtains an assistance session ID received along with the data in step S1201.

In step S1207, the CPU 241 checks whether the assistance session ID obtained in step S1206 has been stored in the assistance session ID list stored in the HDD 244.

In step S1208, the CPU 241 determines whether the assistance session ID obtained in step S1206 is stored in the assistance session ID list stored in the HDD 244 based on a result of the check performed in step S1207. When the determination is affirmative, the CPU 241 proceeds to step S1209. On the other hand, when the determination is negative, the CPU 241 returns to step S1201.

In step S1209, the CPU 241 obtains data from a data buffer corresponding to the assistance session ID obtained in step S1206. The data buffer corresponding to the assistance session ID is implemented in a storage region, such as the HDD 244, for reach assistance session ID. The CPU 241 stores the data to be used in the remote assistance operation, such as information on an image transmitted as an image for transmission from the operator PC 102 to the multifunction peripheral 101, in the data buffer.

In step S1210, the CPU 241 transmits the data obtained in step S1209 to the client. The client in step S1210 is a transmission source of the data received in step S1201, and specifically, the multifunction peripheral 101. After completing the process in step S1210, the CPU 241 returns to step S1201.

In step S1211, the CPU 241 determines whether the data received in step S1201 is a request for transmitting a video image. When the determination is affirmative, the CPU 241 proceeds to step S1212. On the other hand, when the determination is negative, the CPU 241 proceeds to step S1217.

In step S1212, the CPU 241 obtains an assistance session ID received along with the data in step S1201.

In step S1213, the CPU 241 determines whether the assistance session ID obtained in step S1212 has been stored in the assistance session ID list stored in the HDD 244.

In step S1214, the CPU 241 determines whether the assistance session ID obtained in step S1212 is stored in the assistance session ID list stored in the HDD 244 based on a result of the determination made in step S1213. When the determination is affirmative, the CPU 241 proceeds to step S1215. When the determination is negative, the CPU 241 proceeds to step S1201.

In step S1215, the CPU 241 obtains the image data received along with the data received in step S1201.

In step S1216, the CPU 241 stores the image data obtained in step S1215 in a data buffer corresponding to the assistance session ID obtained in step S1212. After completing the process in step S1216, the CPU 241 returns to step S1201. In the process in step S1216, the data transmitted in step S1210 is stored in the data buffer.

In step S1217, the CPU 241 determines whether the data received in step S1201 is a request for terminating the remote assistance operation. When the determination is affirmative, the CPU 241 proceeds to step S1218. On the other hand, when the determination is negative, the CPU 241 proceeds to step S1201.

In step S1218, the CPU 241 obtains the assistance session ID received along with the data in step S1201.

In step S1219, the CPU 241 deletes the assistance session ID obtained in step S1218 from the assistance session ID list stored in the HDD 244 or the like.

In step S1220, the CPU 241 transmits information indicating that the remote assistance operation has been successfully terminated to the client. The client in the process in step S1220 corresponds to one of the multifunction peripheral 101 and the operator PC 102 which transmits the data in step S1201. After completing the process in step S1220, the CPU 241 returns to step S1201.

Figure 8A:
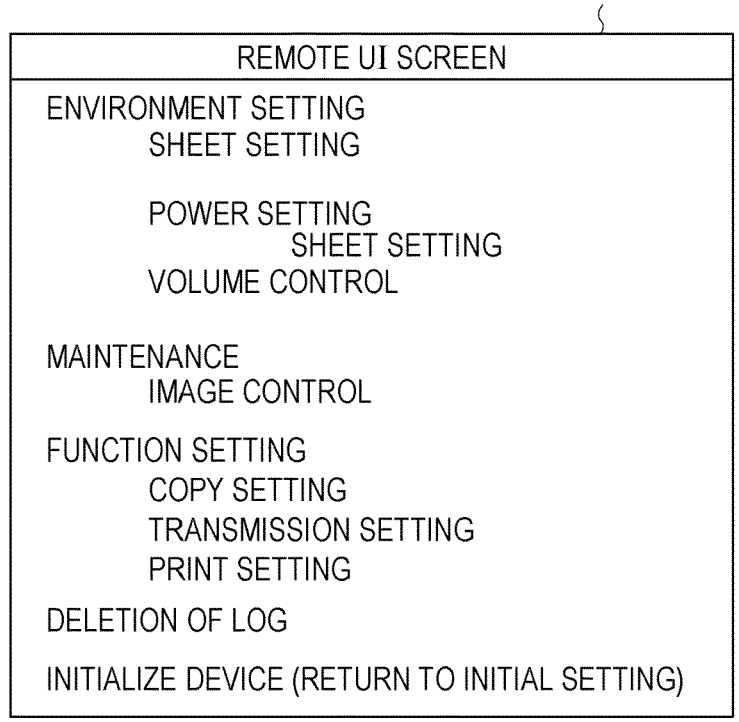
FIGS. 8A and 8B are diagrams illustrating a remote UI screen according to one or more aspects of the present disclosure.
Figure 8B:
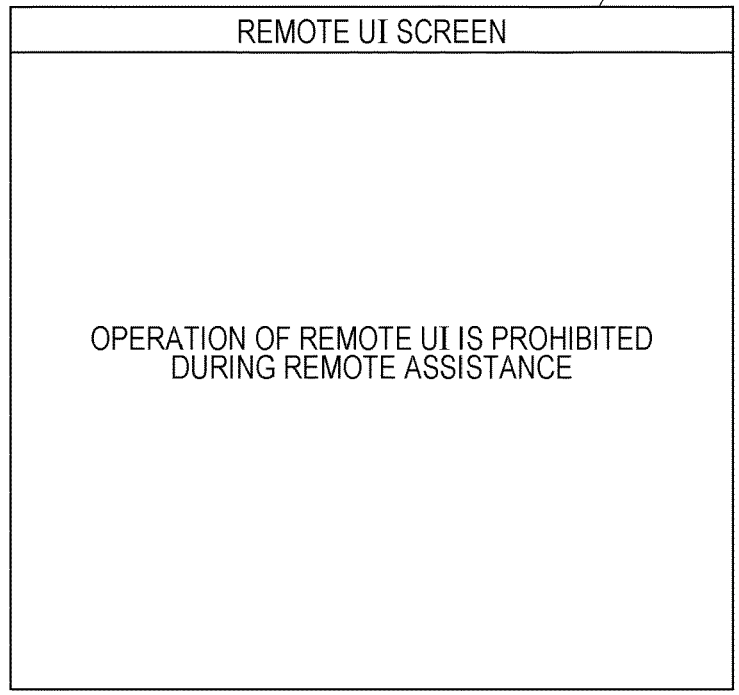
Figure 9:
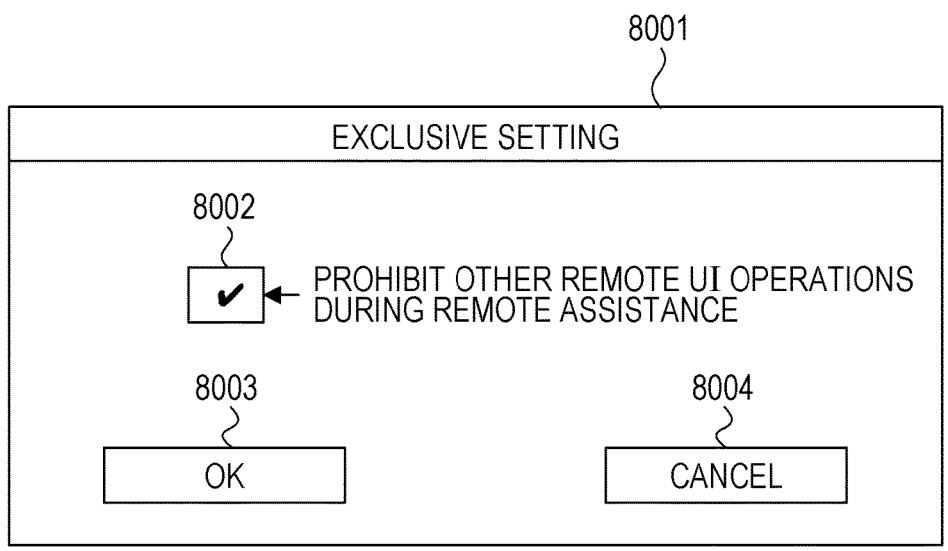
FIG. 9 is a diagram illustrating a screen of a remote assistance operation exclusive setting according to one or more aspects of the present disclosure.

Next, an exclusive control process performed by the multifunction peripheral 101 during the remote assistance operation according to this embodiment will be described with reference to FIGS. 7 to 9. Here, the exclusive control process indicates a process of prohibiting operations other than a specific operation during the specific operation is performed. In this embodiment, in a case where the remote assistance operation is performed on the multifunction peripheral 101, the assistance system prohibits operations other than the remote assistance operation performed on the multifunction peripheral 101 through the remote UI screen.

Figure 7:
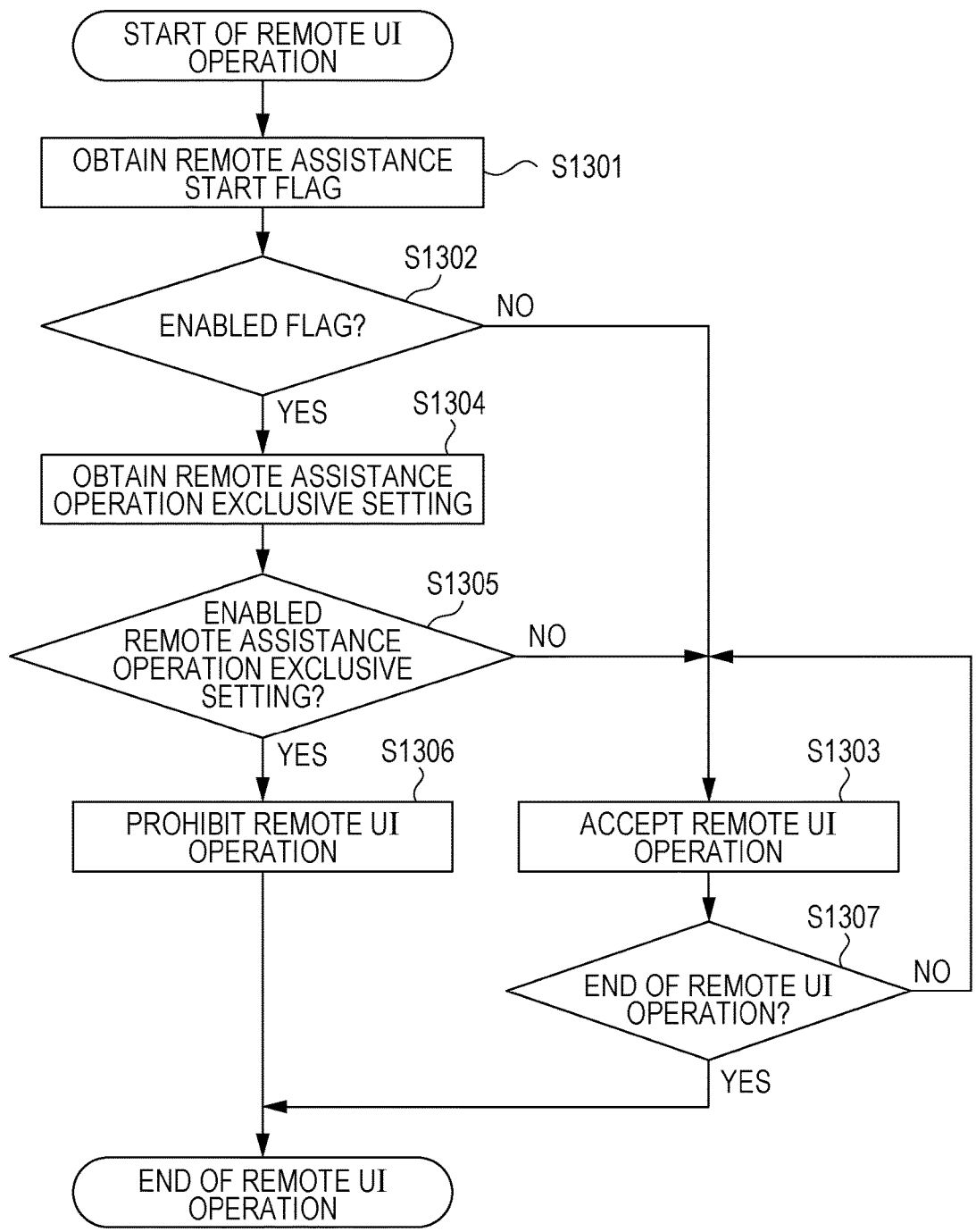
FIG. 7 is a flowchart of a process performed by the multifunction peripheral according to one or more aspects of the present disclosure.

FIG. 7 is a flowchart of the exclusive process in the multifunction peripheral 101 during the remote UI operation according to one or more aspects of the present disclosure.

In step S1301, the CPU 202 obtains a remote assistance start flag stored in the RAM 204. The remote assistance start flag is information indicating whether the remote assistance is being performed.

In step S1302, the CPU 202 determines whether the remote assistance start flag obtained in step S1301 has been enabled. The CPU 202 determines whether the remote assistance start flag has been enabled by determining whether the information indicating the remote assistance start flag obtained in step S1301 indicates that the remote assistance start flag has been enabled. When determining that the remote assistance start flag obtained in step S1301 has been enabled, the CPU 202 proceeds to step S1304, and otherwise, the CPU 202 proceeds to step S1303.

In step S1303, the CPU 202 receives an operation instruction externally input through the remote UI screen. FIG. 8A is a diagram illustrating a remote UI screen 7001 provided by the CPU 202. When receiving a request for an operation through the remote UI from an external PC, an external mobile terminal, of the like, the CPU 202 transmits information on the remote UI screen 7001 to the request source. The request source, such as the external PC or the external mobile terminal, displays the remote UI screen 7001 corresponding to the transmitted information in a display unit. The request source, such as the external PC or the external mobile terminal, receives an instruction for operating the multifunction peripheral 101 based on a user operation input through the displayed remote UI screen 7001 and transmits the received operation instruction to the multifunction peripheral 101. The CPU 202 performs an operation in accordance with the transmitted operation instruction. By the process described above, the operation of the multifunction peripheral 101 through the remote UI screen is realized. The remote UI screen 7001 is an example of an operation screen used for the operation of the multifunction peripheral 101. The process in step S1303 is an example of an acceptance process of accepting an operation performed on the multifunction peripheral 101.

In step S1304, the CPU 202 obtains exclusive setting information from the HDD 205. The exclusive setting information indicates whether the exclusive control process is to be performed during the remote assistance operation and is stored in the HDD 205. FIG. 9 is a diagram illustrating an exclusive setting screen 8001 displayed by the operation panel 212 of the multifunction peripheral 101 according to one or more aspects of the present disclosure. The exclusive setting screen 8001 includes a check box 8002, an OK button 8003, and a cancel button 8004. When detecting a selection of the OK button 8003 in a state in which the check box 8002 is checked, the CPU 202 sets information indicating that other operations are prohibited during the remote assistance operation as the exclusive setting information. The exclusive setting screen 8001 is an example of a setting screen to which a determination as to whether an operation performed on the multifunction peripheral 101 is accepted during the remote assistance is set.

When the exclusive setting information indicates prohibition of other operations during the remote assistance operation and the multifunction peripheral 101 is being subjected to the remote assistance operation, the CPU 202 prohibits operations through the remote UI screen. The CPU 202 may prohibit only operations which may interfere with the remote assistance operation among operations performed through the remote UI screen. In the example of FIG. 9, the check box 8002 is checked.

Although the exclusive setting information is stored in the HDD 205 in this embodiment, the information may be stored in the ROM 203, an external storage device, or the like. Furthermore, the multifunction peripheral 101 may not use the exclusive setting information. In this case, when determining that the remote assistance start flag has been enabled in step S1302, the CPU 202 directly proceeds to step S1306 without performing the process in step S1304 and step S1305.

In step S1305, the CPU 202 determines whether the exclusive setting information obtained in step S1304 indicates prohibition of other operations during the remote assistance operation. When the determination is affirmative, the CPU 202 proceeds to step S1306. When the determination is negative, the CPU 202 proceeds to step S1303.

In step S1306, the CPU 202 prohibits the remote UI operation. The CPU 202 transmits information on the remote UI screen 7001 illustrated in FIG. 8B, for example, to the request source of the remote UI operation. In the example of FIG. 8B, the remote UI screen 7001 includes a message indicating that operations performed through the remote UI screen are prohibited since the remote assistance operation is being performed. The CPU 202 displays the screen illustrated in FIG. 8B in the display unit of the request source, such as the PC or the mobile terminal, so as to notify the user of prohibition of operations performed through the remote UI screen. When an operation instruction is issued by another user immediately before start of the remote assistance operation, a process corresponding to the operation performed by the user is performed during the remote assistance operation, and therefore, the remote assistance operation may be obstructed. To address this case, if an operation instruction has been issued through the remote UI screen, the CPU 202 may stop execution of an operation corresponding to the operation instruction. Then the CPU 202 displays a message or the like indicating that execution of the operation corresponding to the operation instruction has been cancelled in the display unit of the operation request source, such as the PC or the mobile terminal, for example. The process in step S1306 is an example of a control process of not accepting an operation on the multifunction peripheral 101 during the remote assistance.

In step S1307, the CPU 202 determines whether the operation performed through the remote UI screen has been terminated. When the remote UI screen is displayed, and thereafter, is closed, for example, the operation request source transmits information indicating that the remote UI screen has been closed to the multifunction peripheral 101. When receiving the information indicating that the remote IU screen has been closed from the request source of the operation performed through the remote UI screen, the CPU 202 determines that the operation performed through the remote UI screen has been terminated. Furthermore, when not receiving the information indicating that the remote IU screen has been closed from the request source of the operation performed through the remote UI screen, the CPU 202 determines that the operation performed through the remote UI screen has not been terminated. When determining that the operation performed through the remote UI screen has been terminated, the CPU 202 terminates the process in FIG. 7 whereas when determining that the operation performed through the remote UI screen has not been terminated, the CPU 202 returns to step S1303.

As described above, according to this embodiment, the multifunction peripheral 101 may prohibit operations performed through the remote UI screen during the remote assistance operation by performing the process in FIG. 7. Specifically, an operation which may interfere with the remote assistance operation is not performed during the remote assistance operation. By this, the assistance system may improve stability of the remote assistance operation on the multifunction peripheral 101 and reduce possibility that the remote assistance operation is obstructed.

According to this embodiment, the CPU 202 prohibits operations performed through the remote UI screen during the remote assistance operation. However, the CPU 202 may prohibit operations performed through the operation unit of the multifunction peripheral 101, such as the operation panel 212, in addition to operations performed through the remote UI screen during the remote assistance operation. Furthermore, the CPU 202 may prohibit an operation corresponding to a command transmitted to the multifunction peripheral 101 without using the remote UI screen, for example, during the remote assistance operation.

Furthermore, in this embodiment, the CPU 202 prohibits all operations other than the remote assistance operation during the remote assistance operation. However, in a case where only a specific operation may interfere with the remote assistance operation, the CPU 202 may prohibit only the specific operation during the remote assistance operation. Specifically, the CPU 202 may prohibit set operations during the remote assistance operation. Examples of the set operations include all operations other than the remote assistance operation and a specific operation.

In a case where only an operation of updating a value of setting information of the multifunction peripheral 101 may interfere with the remote assistance operation, the CPU 202 may perform the following operation. Specifically, the CPU 202 may prohibit the operation of updating a value of the setting information of the multifunction peripheral 101 to be instructed through the remote UI screen during the remote assistance operation. Furthermore, in a case where only an initializing operation of the multifunction peripheral 101 may interfere with the remote assistance operation, the CPU 202 may perform the following operation. Specifically, the CPU 202 may prohibit the initializing operation of the multifunction peripheral 101 to be instructed through the remote UI screen during the remote assistance operation. Furthermore, in a case where only an operation of clearing a log stored in the HDD 205 or the like of the multifunction peripheral 101 may interfere with the remote assistance operation, the CPU 202 may perform an operation below. The log is history information on operation of the multifunction peripheral 101. Specifically, the CPU 202 may prohibit the operation of clearing the log of the multifunction peripheral 101 to be instructed through the remote UI screen during the remote assistance operation.

Accordingly, the CPU 202 prohibits only certain operations and permits the other operations so that operations which do not interfere with the remote assistance operation are executable and usability may be improved.

Second Embodiment

In the first embodiment, the multifunction peripheral 101 prohibits operations to be input by any user through the remote UI screen during the remote assistance operation.

However, depending on a multifunction peripheral, update of a value of setting information and obtainment of specific information may be performed only by an operation through a remote UI screen. For example, an operator who performs remote assistance operation desires to update setting information of a multifunction peripheral 101 or obtain specific information. In this case, a user of the multifunction peripheral 101 which is a target of assistance by the remote assistance operation is allowed to operate the multifunction peripheral 101 through the remote UI screen during the remote assistance operation.

Therefore, in this embodiment, if a user who is an assistance target of the remote assistance operation coincides with a user who is performing an operation through the remote UI screen, the assistance system performs control such that other operations performed through the remote UI screen are allowed even during the remote assistance operation.

A system configuration of the assistance system of this embodiment is the same as that of the first embodiment. Furthermore, hardware configurations of components of the assistance system are also the same as those of the first embodiment. Furthermore, a functional configuration of the multifunction peripheral 101 is also the same as that of the first embodiment.

Figure 10:
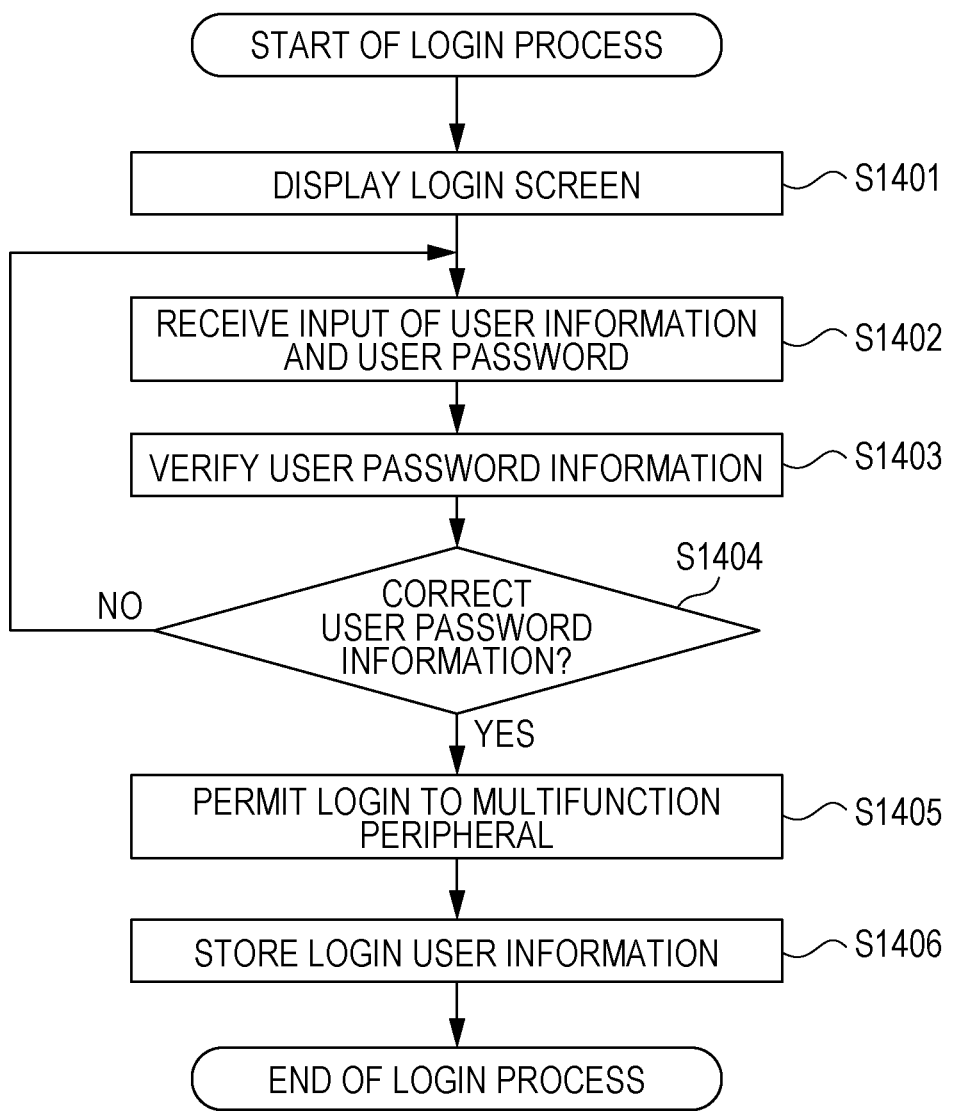
FIG. 10 is a flowchart of a process performed by a multifunction peripheral according to one or more aspects of the present disclosure.

FIG. 10 is a flowchart of a process performed by the multifunction peripheral 101 according to one or more aspects of the present disclosure. A process of logging into the multifunction peripheral 101 will be described with reference to FIG. 10.

In step S1401, a CPU 202 displays a login screen in an operation panel 212. The login screen accepts input of login information (such as user information including a user ID and a password) of a user and includes input columns for inputting the user information and the password, for example.

In step S1402, the CPU 202 receives input of user information and a password of the user through the login screen displayed in the operation panel 212 in step S1401. The CPU 202 stores the input user information and the input password information in a RAM 204. Although the CPU 202 uses the RAM 204 for temporarily storing the user information and the password in this embodiment, other storage devices, such as a HDD 205, may be used.

In this embodiment, the HDD 205 stores a password associated with user information of a registered user in an encrypted state in advance.

In step S1403, the CPU 202 obtains information on the encrypted password associated with the user information which is received in step S1402 from the HDD 205 and decrypts the password. Then the CPU 202 compares the password received in step S1402 with the decrypted password so as to check whether the passwords coincide with each other, that is, whether the password is correct.

In step S1404, the CPU 202 determines whether the password received in step S1402 is correct based on a result of the verification process performed in step S1403. When the determination is affirmative, the process proceeds to step S1405. On the other hand, when the determination is negative, the CPU 202 displays a screen indicating failure of login in the operation panel 212 and returns to step S1402.

In step S1405, the CPU 202 permits the login of the user corresponding to the user information and the password which are received in step S1402 to the multifunction peripheral 101.

In step S1406, the CPU 202 stores the user information of the user who is allowed to login in step S1405 in the RAM 204 and terminates the process in FIG. 10.

FIG. 11 is a flowchart of a process performed by the multifunction peripheral 101 according to one or more aspects of the present disclosure. An exclusive control process performed by the multifunction peripheral 101 during remote assistance operation in this embodiment will be described with reference to FIG. 11. Operations in step S1501 to step S1507 are the same as operations in step S1301 to step S1307 in FIG. 7, respectively. However, an operation in step S1505 is different from that in step S1305 in that, when it is determined that exclusive setting information indicates that operations other than the remote assistance operation are prohibited during the remote assistance operation, the process proceeds to step S1508. Furthermore, operations in step S1508 to step S1509 which are not included in the process in FIG. 7 correspond to a process of comparing user information.

Hereinafter, portions in the process in FIG. 11 which are different from the process in FIG. 7 will be described.

In step S1508, the CPU 202 obtains user information of a user who has logged in the multifunction peripheral 101 which is a target of assistance by the remote assistance operation and user information of a user who has transmitted an operation request through a remote UI screen from the RAM 204.

In step S1509, the CPU 202 compares the user information of the user who is the target of assistance by the remote assistance operation obtained in step S1508 with the user information of the user who has transmitted an operation request through the remote UI screen obtained in step S1508 so as to determine whether the user information coincides with each other.

When the determination is affirmative, the CPU 202 proceeds to step S1503 where the CPU 202 accepts the operation through the remote UI screen. On the other hand, when the determination is negative, the CPU 202 proceeds to step S1506 where the CPU 202 prohibits the operation through the remote UI screen.

As described above, according to this embodiment, the CPU 202 may allow the user who is an assistance target by the remote assistance operation to perform an operation on the multifunction peripheral 101 during the remote assistance operation in accordance with the process in FIG. 11. Then the CPU 202 may prohibit users other than the user of the target of assistance by the remote assistance operation from performing the operation. In this way, even in a case where update of setting information and obtainment of specific information may be performed only by operating the remote UI screen, a user of an assistance target may perform an operation through the remote UI screen while operations of other users are prohibited. Specifically, the assistance system may improve usability.

Advantages of this embodiment are described below. A user who does not recognize performance of remote assistance does not change setting information associated with a network of a multifunction peripheral which is a target of the remote assistance. Specifically, the remote assistance of an operator of the multifunction peripheral is not interrupted. Similarly, information required for the remote assistance is not deleted when another user clears a log of the multifunction peripheral or performs initialization during the remote assistance.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-255528 filed Dec. 28, 2016, which is hereby incorporated by reference herein in its entirety.

What is claimed is:

1. An image processing apparatus comprising:
a display panel configured to display information, the display panel capable of displaying a display panel operation screen for receiving a user instruction; and
at least one controller configured to function as:
a unit configured to transmit, to an external device via a network, information of a remote operation screen for receiving a predetermined remote instruction from the external device, in response to a request of the remote operation screen from the external device;
a unit configured to execute a remote operation function, to receive a remote instruction from the external device, wherein information corresponding to the display panel operation screen is transmitted continuously to the external device via the network during the execution of the remote operation function; and
a unit configured to, based on information indicating that the second remote operation function is currently executed, prohibit to transmit the information of the remote operation screen for receiving the predetermined remote instruction.

2. The image processing apparatus according to claim 1, wherein the predetermined remote instruction is an instruction for updating setting information of the image processing apparatus.

3. The image processing apparatus according to claim 1, wherein the predetermined remote instruction is an instruction for deletion of a log.

4. The image processing apparatus according to claim 1, wherein the predetermined remote instruction is an instruction for initialization of the image processing apparatus.

5. The image processing apparatus according to claim 1, wherein the information corresponding to the display panel operation screen is provided to the external device via a server based on execution of remote operation function, and is used for displaying on a screen.

6. The image processing apparatus according to claim 1, wherein the controller does not transmit the information of the remote operation screen for receiving the predetermined remote instruction, and provides information of an screen that shows not being possible to execute the process corresponding to the predetermined remote instruction, in response to a request of the remote operation screen from the external device during a period of executing the remote operation function.

7. The image processing apparatus according to claim 1, further comprising an image forming device configured to form an image on a sheet.

8. The image processing apparatus according to claim 1, further comprising a reading device configured to read a document.

9. A non-transitory recording medium having program of a control method of an image processing apparatus stored, the image processing apparatus being provided with a display panel for displaying information that is able to display a display panel operation screen for receiving a user instruction, the method comprising:
- transmitting, to an external device via a network, information of a remote operation screen or receiving a predetermined remote instruction from the external device in response to a request of the remote operation screen from the external device;
- executing a remote operation function to receive a remote instruction from the external device, wherein information corresponding to the display panel operation screen to an is transmitted continuously to the external device via the network during the execution of the remote operation function; and
- prohibiting, based on information indicating that the remote operation function is currently executed, to transmit the information of the remote operation screen for receiving the predetermined remote instruction.

10. The non-transitory recording medium according to claim 9, wherein the predetermined remote instruction is an instruction for updating setting information of the image processing apparatus, an instruction for deletion of a log, or an instruction for initialization of the image processing apparatus.

11. The non-transitory recording medium according to claim 9, wherein the information corresponding to the display panel operation screen is provided to the external device via a server based on execution of remote operation function, and is used for displaying on a screen.

12. The non-transitory recording medium according to claim 9, further comprising forming an image on a sheet.

13. The non-transitory recording medium according to claim 9, further comprising reading a document.

* * * * *